(12) United States Patent
Kawato et al.

(10) Patent No.: US 12,518,554 B2
(45) Date of Patent: Jan. 6, 2026

(54) INFORMATION PROCESSING DEVICE AND METHOD TO DISPLAY LINK UNITS OF FIRST AND SECOND DOCUMENTS, AND NON-TRANSITORY COMPUTER READABLE STORAGE MEDIUM STORING DOCUMENT PROCESSING PROGRAM

(71) Applicant: LegalOn Technologies, Inc., Tokyo (JP)

(72) Inventors: Takashi Kawato, Tokyo (JP); Ruka Funaki, Tokyo (JP); Tomoko Uchida, Tokyo (JP)

(73) Assignee: LegalOn Technologies, Inc., Tokyo (JP)

( * ) Notice: Subject to any disclaimer, the term of this patent is extended or adjusted under 35 U.S.C. 154(b) by 371 days.

(21) Appl. No.: 18/048,179

(22) Filed: Oct. 20, 2022

(65) Prior Publication Data

US 2023/0106060 A1  Apr. 6, 2023

Related U.S. Application Data

(63) Continuation of application No. PCT/JP2020/017628, filed on Apr. 24, 2020.

(51) Int. Cl.
*G06V 30/418* (2022.01)
*G06V 30/416* (2022.01)
(Continued)

(52) U.S. Cl.
CPC .......... *G06V 30/418* (2022.01); *G06V 30/416* (2022.01); *G06F 3/048* (2013.01); *G06V 30/19173* (2022.01)

(58) Field of Classification Search
None
See application file for complete search history.

(56) References Cited

U.S. PATENT DOCUMENTS 8,971,670 B2 * 3/2015 Itoh .................. G06V 10/98
382/229
2007/0005549 A1 * 1/2007 Zhou .................. G06F 16/835
(Continued)

FOREIGN PATENT DOCUMENTS

JP   2003-308318 A   10/2003
JP   2007-133587 A    5/2007
(Continued)

OTHER PUBLICATIONS

PCT International Search Report issued in PCT Application No. PCT/JP2020/017628, mailed from the Japan Patent Office on Oct. 28, 2021. (5 pages).

(Continued)

*Primary Examiner* — Haris Sabah
(74) *Attorney, Agent, or Firm* — Finnegan, Henderson, Farabow, Garrett & Dunner LLP

(57) ABSTRACT

An information processing device includes one or more hardware processors configured to divide first document information and second document information in a predefined unit; calculate a degree of relevance between units included in the first document information and units included in the second document information; link the units included in the first document information with the units included in the second document information on a one-to-one basis according to the degree of relevance; and display combinations of the units in the first document information and the units in the second document information linked with each other.

21 Claims, 13 Drawing Sheets

(51) Int. Cl.
G06F 3/048 (2013.01)
G06V 30/19 (2022.01)

(56) References Cited

U.S. PATENT DOCUMENTS

| | | | | |
|---|---|---|---|---|
| 2016/0019008 | A1* | 1/2016 | Matsumoto | G06F 3/1256 |
| | | | | 358/1.15 |
| 2016/0086063 | A1* | 3/2016 | Horii | G06K 15/1807 |
| | | | | 358/1.15 |
| 2016/0165093 | A1* | 6/2016 | Iizuka | H04N 1/3876 |
| | | | | 358/1.13 |
| 2020/0117893 | A1* | 4/2020 | Whelan | G06V 30/418 |
| 2020/0327172 | A1* | 10/2020 | Coquard | G06F 16/9035 |

FOREIGN PATENT DOCUMENTS

| | | |
|---|---|---|
| JP | 5383943 B1 | 1/2014 |
| JP | 2016-099645 A | 5/2016 |

OTHER PUBLICATIONS

PCT Written Opinion issued in PCT Application No. PCT/JP2020/017628, mailed from the Japan Patent Office on Jun. 30, 2020. (3 pages).

PCT First Notice and PCT Second and Supplementary Notice Informing the Applicant of the Communication of the International Application to the Designated Offices corresponding with PCT Application No. PCT/JP2020/017628, mailed Nov. 25, 2021 and Aug. 25, 2022 respectively.

* cited by examiner

|  | B-1 | B-2 | B-3 | B-4 | B-5 | B-6 |
|---|---|---|---|---|---|---|
| A-1 | 0.5 | 0.1 | 0.1 | 0.1 | 0.1 | 0.1 |
| A-2 | 0.2 | 0.5 | 0.8 | 0.1 | 0.1 | 0.4 |
| A-3 | 0.1 | 0.4 | 0.1 | 0.5 | 0.1 | 0.1 |
| A-4 | 0.1 | 0.1 | 0.1 | 0.1 | 0.5 | 0.1 |
| A-5 | 0.1 | 0.1 | 0.1 | 0.1 | 0.1 | 0.7 |
| A-6 | 0.1 | 0.1 | 0.1 | 0.7 | 0.1 | 0.1 |
| A-7 | 0.1 | 0.1 | 0.1 | 0.1 | 0.1 | 0.1 |

|  | B-1 | B-2 | B-3 | B-4 | B-5 | B-6 |
|---|---|---|---|---|---|---|
| A-1 | 1 |  |  |  |  |  |
| A-2 |  |  | 1 |  |  |  |
| A-3 |  | 1 |  |  |  |  |
| A-4 |  |  |  |  | 1 |  |
| A-5 |  |  |  |  |  | 1 |
| A-6 |  |  |  | 1 |  |  |
| A-7 |  |  |  |  |  |  |

INFORMATION PROCESSING DEVICE AND METHOD TO DISPLAY LINK UNITS OF FIRST AND SECOND DOCUMENTS, AND NON-TRANSITORY COMPUTER READABLE STORAGE MEDIUM STORING DOCUMENT PROCESSING PROGRAM

CROSS-REFERENCE TO RELATED APPLICATIONS

This application is a continuation application of International Application No. PCT/JP2020/017628, filed Apr. 24, 2020, which designates the United States, the entire content of which is incorporated herein by reference.

TECHNICAL FIELD

This disclosure relates to a non-transitory computer readable storage medium storing a document processing program, an information processing device, and a document processing method.

BACKGROUND

Conventionally, information processing devices are proposed, which compare a written agreement with relevant laws and regulations for analysis to display a result of the analysis including a list of relevant articles associated with the individual articles of the agreement (for example, see Japanese Patent No. 5383943).

Such an information processing device generates a document vector for each of articles included in multiple laws and regulations to compare the document vectors of the articles and generate article groups by combining articles with similarity of a predefined threshold or more. In response to an input of contract data, the information processing device then generates a document vector for each clause of the contract data to compare between the document vectors of the clauses and the document vectors of the article groups. The information processing device specifies each article included in the similar article groups as an article relevant to the contract clause in question, and generates an analysis result screen showing a list of the relevant articles associated with each contract clause.

SUMMARY

One aspect of the present disclosure is to provide a document processing program, an information processing device, and a document processing method as below.

According to one embodiment, a non-transitory computer readable storage medium stores a document processing program for causing a computer to function as a divider element configured to divide first document information and second document information in a predefined unit; a computing element configured to calculate a degree of relevance between one or more units included in the first document information and one or more units included in the second document information; a link element configured to link the one or more units included in the first document information with the one or more units included in the second document information on a one-to-one basis according to the degree of relevance; and a display control element configured to display, in combination, the one or more units included in the first document information and the one or more units included in the second document information individually linked with the one or more units included in the first document information.

According to another embodiment, an information processing device includes one or more hardware processors configured to divide first document information and second document information in a predefined unit; calculate a degree of relevance between one or more units included in the first document information and one or more units included in the second document information; link the one or more units included in the first document information with the one or more units included in the second document information on a one-to-one basis according to the degree of relevance; and display, in combination, the one or more units included in the first document information and the one or more units included in the second document information individually linked with the one or more units included in the first document information.

According to yet another embodiment, a document processing method includes linking one or more units included in first document information with one or more units included in second document information on a one-to-one basis according to a degree of relevance between the one or more units included in the first document information with the one or more units included in the second document information; and displaying, in combination, the one or more units included in the first document information and the one or more units included in the second document information individually linked with the one or more units included in the first document information.

Additional objects and advantages will be set forth in part in the description which follows, and in part will be obvious from the description, or may be learned by practice. The objects and advantages will be realized and attained by means of the elements and combinations particularly pointed out in the appended claims.

It is to be understood that both the foregoing general description and the following detailed description are exemplary and explanatory only and are not restrictive of the invention, as claimed.

The accompanying drawings, which are incorporated in and constitute a part of this specification, illustrate several embodiments of the invention and together with the description, serve to explain the principles of the invention.

BRIEF DESCRIPTION OF DRAWINGS

FIG. 5A is a schematic diagram illustrating an exemplary configuration of relevance information and linking information;

FIG. 5B is a schematic diagram illustrating an exemplary configuration of relevance information and linking information;

DESCRIPTION

First Embodiment

According to various embodiments of this disclosure, it is possible to provide a more user-friendly document processing program, an information processing device, and a document processing method.

Configuration of Document Processing System

Figure 1:
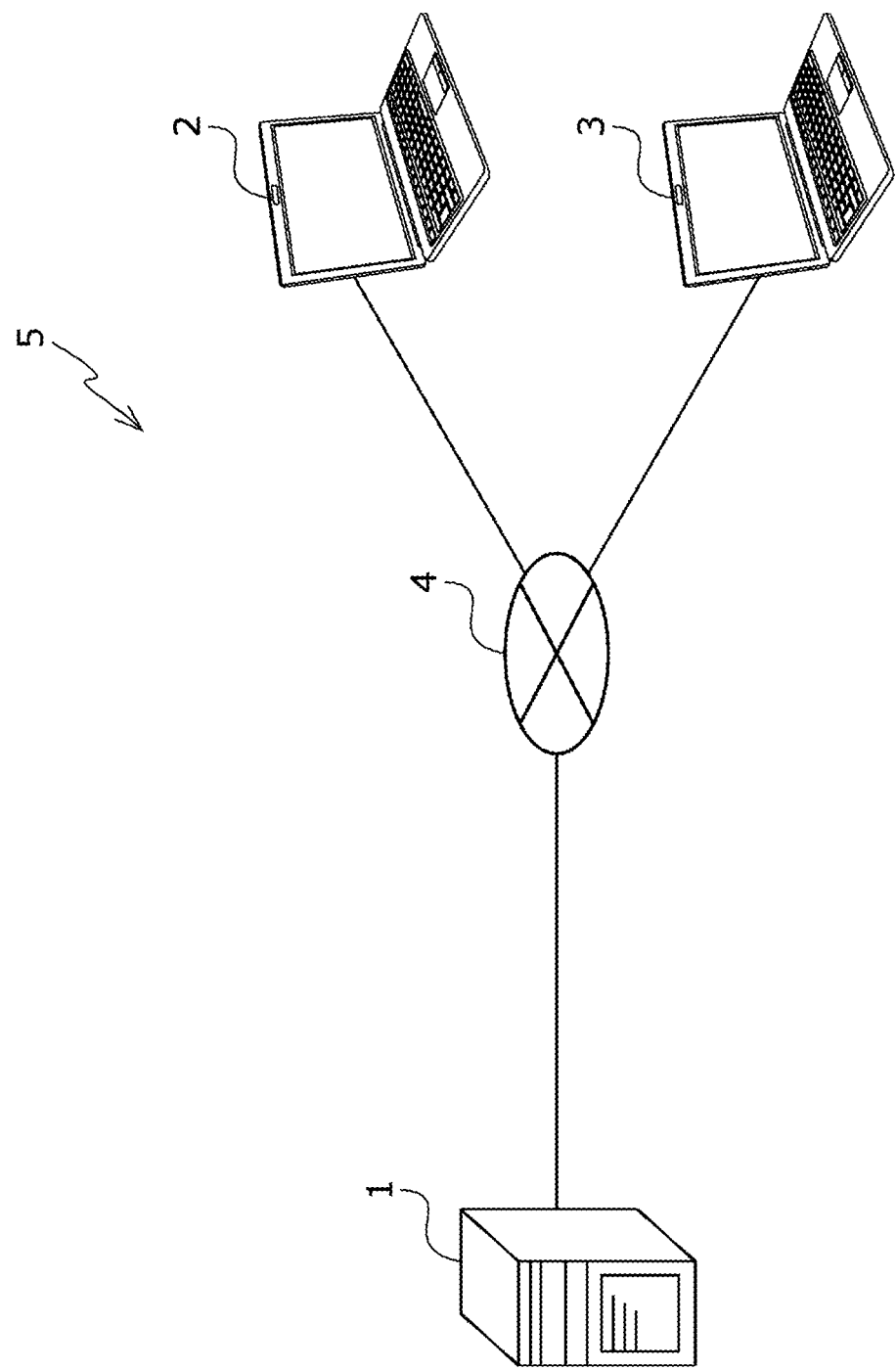
FIG. 1 is a schematic diagram illustrating an exemplary configuration of a document processing system according to an embodiment.

FIG. 1 is a schematic diagram illustrating an exemplary configuration of a document processing system according to an embodiment. A document processing system 5 according to an embodiment includes a document processing server device 1, a terminal 2, and a terminal 3 which are communicably connected to one another via a network 4. The terminal 2 is, for example, operated by a user who desires to prepare a document, confirm the content of a document, and/or review a document. The terminal 3 may be operated by another user who desires, among others, to prepare a document, confirm the content of a document, and/or review a document. The users of the terminal 2 and the terminal 3 may repeat corrections and approval of the corrections as to document information, e.g., a contract, until both reach an agreement on the details of the contract. The users may use the document processing system 5 to compare two sets of document information prepared or edited by both of the users to know the relationship therebetween. Alternatively, the users may also use the document processing system 5 to compare document information prepared by some user and prepared template document information to know the relationship therebetween. The users may also use the document processing system 5 to compare any two sets of document information.

The document processing server device 1 may be a server-type information processing device which operates in response to requests from the terminal 2 and the terminal 3. The body of the document processing server device 1 may include electronic elements such as a central processing unit (CPU) having information processing functions, a hard disk drive (HDD), and a flash memory. The document processing server device 1 may include a plurality of information processing devices operable in mutual cooperation or the document processing server device 1 may be operated by any cloud service. Moreover, the functions of the document processing server device 1 may be implemented within the terminal 2 and/or the terminal 3.

The terminal 2 and the terminal 3 may be information processing devices such as personal computers (PCs) or tablet terminals or the like. The bodies of the terminal 2 and the terminal 3 may include electronic elements such as a CPU having information processing functions and a flash memory.

The network 4 may be a communication network capable of high-speed communications. For example, the network 4 may be a wired or wireless communication network such as the Internet, an intranet, and a local area network (LAN).

As configured as above, for example, the document processing server device 1 may process legal documents such as a contract or an agreement. Either or both of the users may not be legal experts but persons who need to draft a written agreement, or may be legal experts such as an attorney who has knowledge in drafting agreements. In another example, either or both of the users may be staff members in a business/sales department or a legal department of a company.

A basic operation may be such that either of the users uploads document information from the terminal 2 or the terminal 3 onto the document processing server device 1 and transmits a request for reviewing a draft agreement to the terminal 3 or terminal 2 from the terminal 2 or terminal 3 via the document processing server device 1 or via other means such as email. Both of the users may work on preparing a written agreement reflecting both users' opinions and results of the review, by editing the document information on the document processing server device 1 using the terminal 2 and the terminal 3. To reduce the workload of the users or to assist the users to prepare a written agreement by themselves, the document processing server device 1 may compare two more sets of document information.

In the present embodiment, the document processing server device 1 may detect correspondence between the sets of document information and changes made therein through comparison to present the detected information to either or both of the users. In the following, a clause may be referred to as an "article". Embodiments will be described below.

In FIG. 1, a single terminal 2 and a single terminal 3 are depicted. However, multiple terminals, such as three or more terminals 2 and 3, may be connected to the network 4. Similarly, each of the terminals 2 and terminals 3 may be operated by multiple users.

Configuration of Document Processing Server Device

Figure 2:
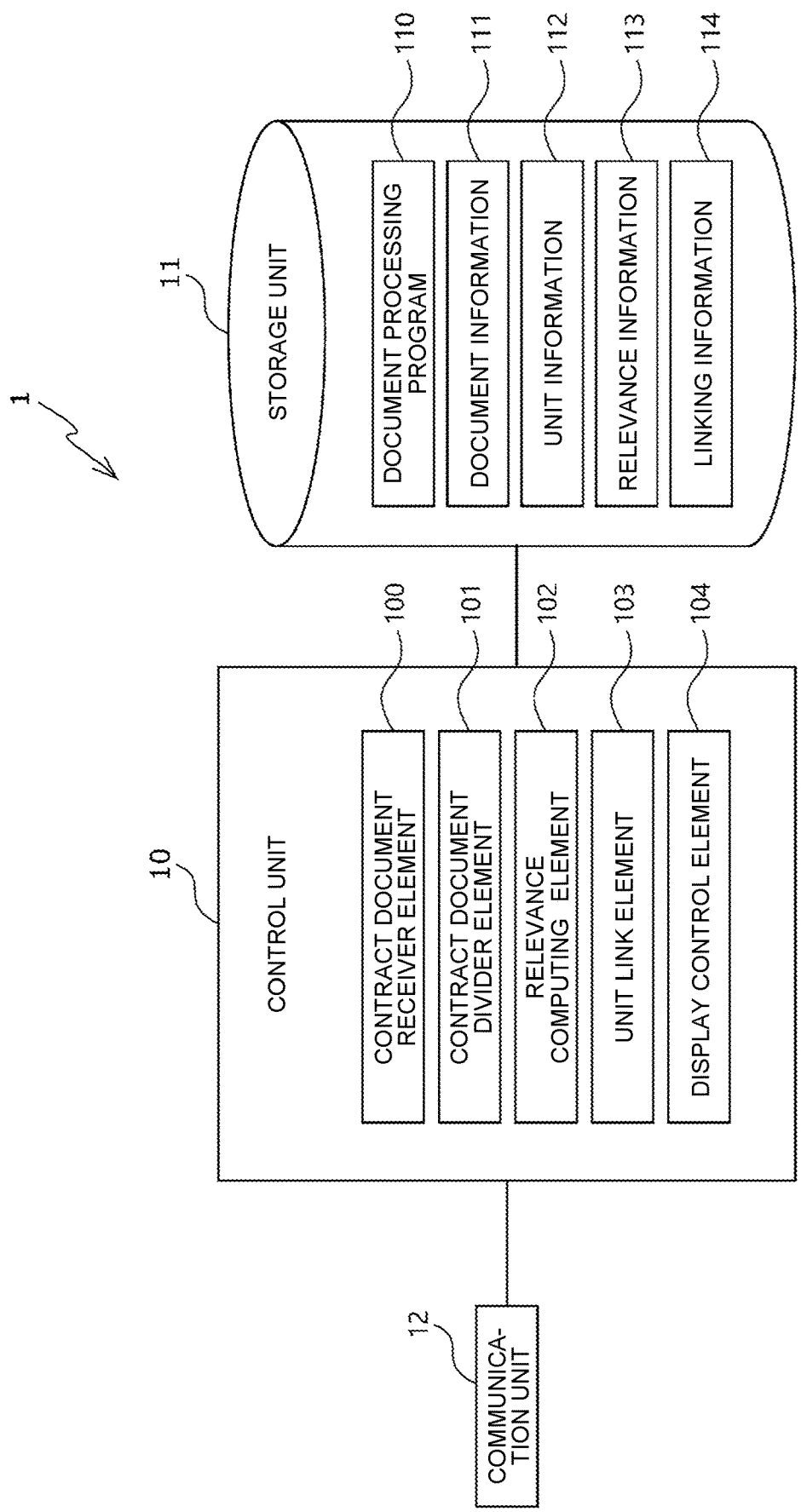
FIG. 2 is a block diagram illustrating an exemplary configuration of a document processing server device according to an embodiment.

FIG. 2 is a block diagram illustrating an exemplary configuration of the document processing server device 1 according to an embodiment. The document processing server device 1 includes a control unit 10 having a CPU to control the respective elements and execute various kinds of computer programs; a storage unit 11 including a storage medium such as a flash memory to store information therein; and a communication unit 12 functioning as a communication interface for communicating with outside via the network 4.

The control unit 10 may include at least one processor such as a CPU, and is electrically connected to the storage unit 11 including at least one memory and the communication unit 12 functioning as a communication interface. By executing a document processing program 110, which will be described below, the control unit 10 may function as a contract document receiver element 100, a contract document divider element 101, a relevance computing element 102, a unit link element 103, a display control element 104, and else.

The contract document receiver element 100 may receive a contract document as document information 111 from the terminal 2 or terminal 3, and may store the document information in the storage unit 11.

The contract document divider element 101 may divide the document information 111 into contract elements such as a title, a preface, and article units, and may store the elements in the storage unit 11 as unit information 112. As for the article units, the unit of divisions can be articles, sections or items, or a group of articles, sections, or items with coherent meaning, or sections or items with coherent meaning across different articles or sections.

The relevance computing element 102 may calculate a degree of relevance between one or more sets of unit information 112 included in each of a plurality of sets of, for example, two sets of document information 111 (first document information and second document information), and may store the degree of relevance in the storage unit 11 as relevance information 113.

The unit link element 103 may link the sets of unit information 112 in the two sets of document information 111 with each other on the basis of the relevance information 113 calculated by the relevance computing element 102, and may store the resultant information in the storage unit 11 as linking information 114.

The display control element 104 may control and display the document information 111, the unit information 112, the relevance information 113, and the linking information 114 stored in the storage unit 11 as well as results of the output of the elements 100 to 103 on the displays of the terminal 2 and the terminal 3 by a predefined method. The display method will be described in detail below.

The storage unit 11 may include memory such as a flash memory, and is electrically connected to the control unit 10 including a processor and the communication unit 12 functioning as a communication interface. The storage unit 11 may store therein the document processing program 110 for causing the control unit 10 to operate as each of the elements 100 to 104 described above, the document information 111, the unit information 112, the relevance information 113, and the linking information 114.

Figure 3:
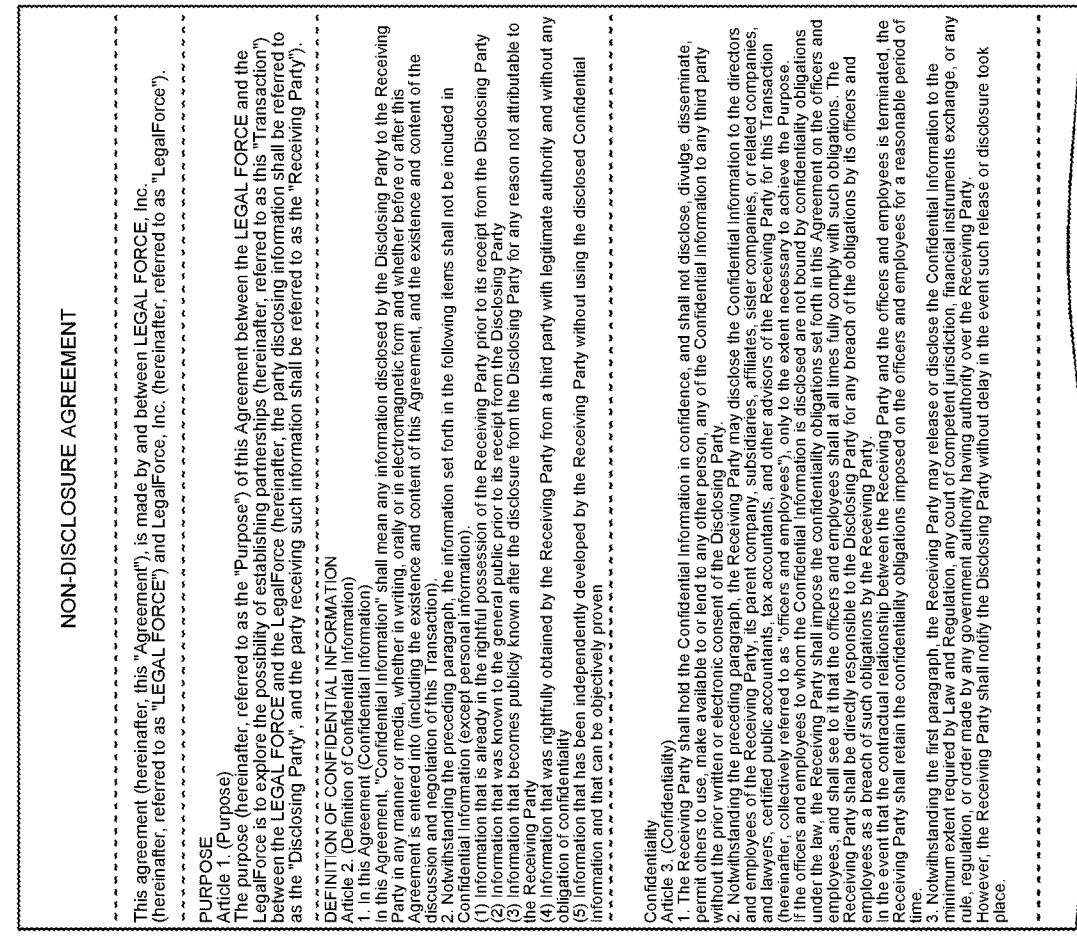
FIG. 3 is a schematic diagram illustrating an exemplary configuration of document information.

FIG. 3 is a schematic diagram illustrating an exemplary configuration of the document information 111. As an example, document information 111a may be a written agreement and includes a title $112a_1$, a preface $112a_2$, and a plurality of articles (article units) $112a_3$, $112a_4$, $112a_5$ ... of the agreement. The article (article unit) $112a_4$ may include a plurality of sections (article units) $112a_{41}$ and $112a_{42}$.

Operation of Document Processing System

Next, an operation of a first embodiment will be described. The operation is divided into (1) basic operation and (2) document comparison operation for explanation. In the following explanation, the terminal 2 is defined as the one to be operated and an operation thereof is described. The same or similar operation of the terminal 3 in place of the terminal 2 will not be described.

(1) Basic Operation

First, the user may operate the terminal 2 to log in the service provided by the document processing server device 1. In response to receipt of an information input such as a user ID and password from the user, the terminal 2 may transmit an authentication request to the document processing server device 1 along with the information.

Receiving the authentication request from the terminal 2 along with the information such as a user ID and password, the document processing server device 1 may authenticate the user as a client, referring to user information including pre-registered user IDs and passwords.

After completion of the service login, the user then may operate the terminal 2 to upload document information as to a contract document to be compared onto the document processing server device 1. The terminal 2 may upload the document information onto the document processing server device 1.

The document processing server device 1 may receive the document information 111 from the terminal 2 as operated by the client for storage in the storage unit 11.

Next, the user may operate the terminal 2 to select the uploaded document information and intended document information to compare. The terminal 2 may transmit a document-information comparison request to the document processing server device 1.

The display control element 104 of the document processing server device 1 may receive the document-information comparison request and displays a screen, illustrated in FIG. 7 below, on the display of the terminal 2.

Figure 7:
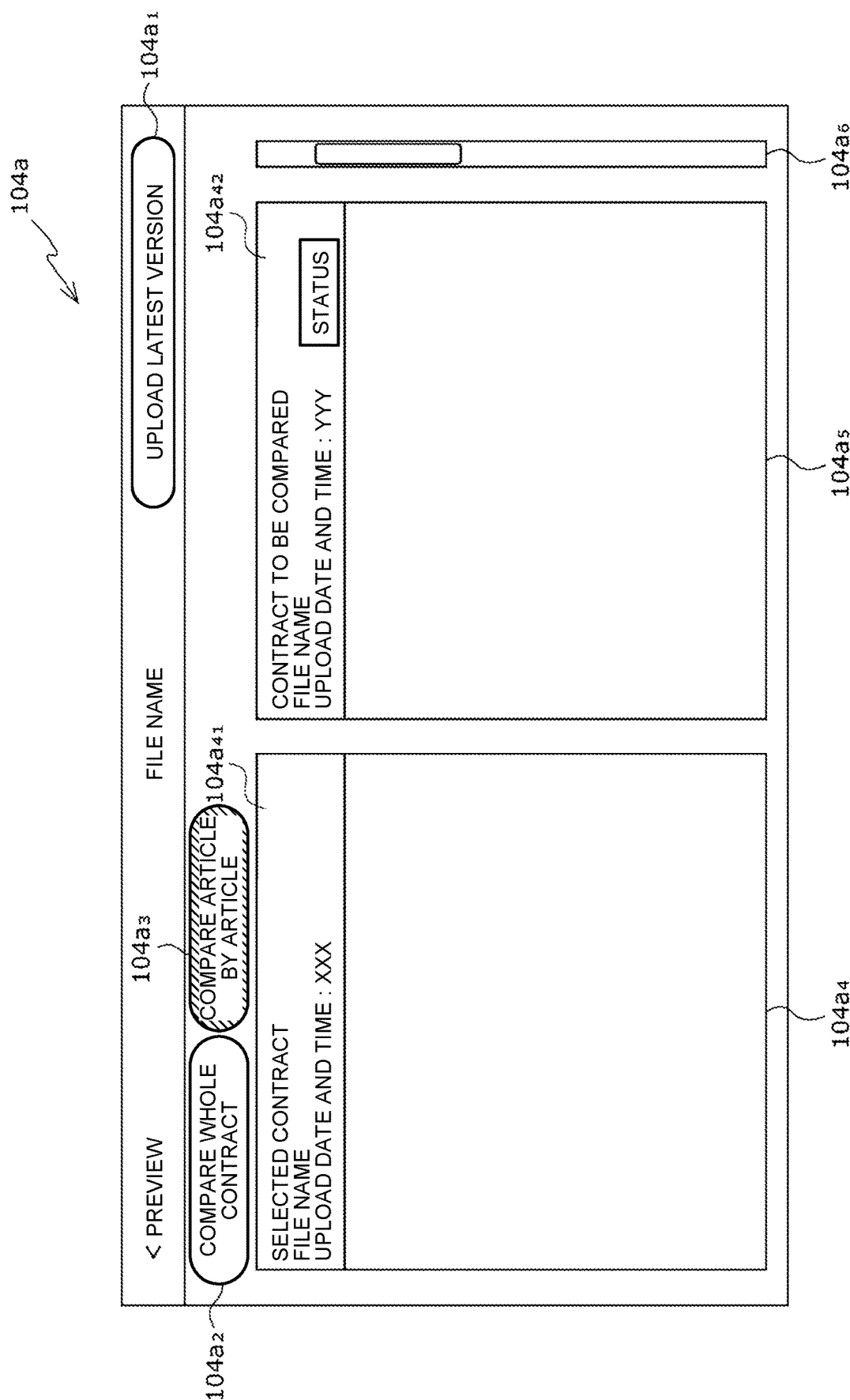
FIG. 7 is a schematic diagram illustrating an exemplary configuration of a screen displayed by a display control element on a display of a terminal.

FIG. 7 is a schematic diagram illustrating an exemplary configuration of a screen displayed on the display of the terminal 2 or 3 by the display control element 104. A screen 104a may include a button $104a_1$ for uploading other document information, a button $104a_2$ for comparing contract documents as a whole, a button $104a_3$ for article-basis comparison, a display field $104a_4$ for showing the contents of document information $104a_{41}$ as a contract document being reviewed (first document information), a display field $104a_5$ for showing the contents of document information $104a_{42}$ as a contract document to be compared (second document information), and a slide bar $104a_6$.

The user may select the document information $104a_{41}$ and the document information $104a_{51}$ to be compared, referring to the screen 104a, and may operate the button $104a_3$ to issue an article-basis comparison request. The terminal 2 may transmit the comparison request to the document processing server device 1.

Receiving the comparison request from the terminal 2 along with the document information being reviewed and the contract document to be compared (S1 in FIG. 9), the document processing server device 1 may start a document comparison operation as described below. The document processing server device 1 may receive the comparison request along with the type and status of the contract document. Alternatively, the document processing server device 1 may extract the type and status of the contract document from the document information under review and/or the document information to be compared.

(2) Document Comparison Operation

Figure 9:
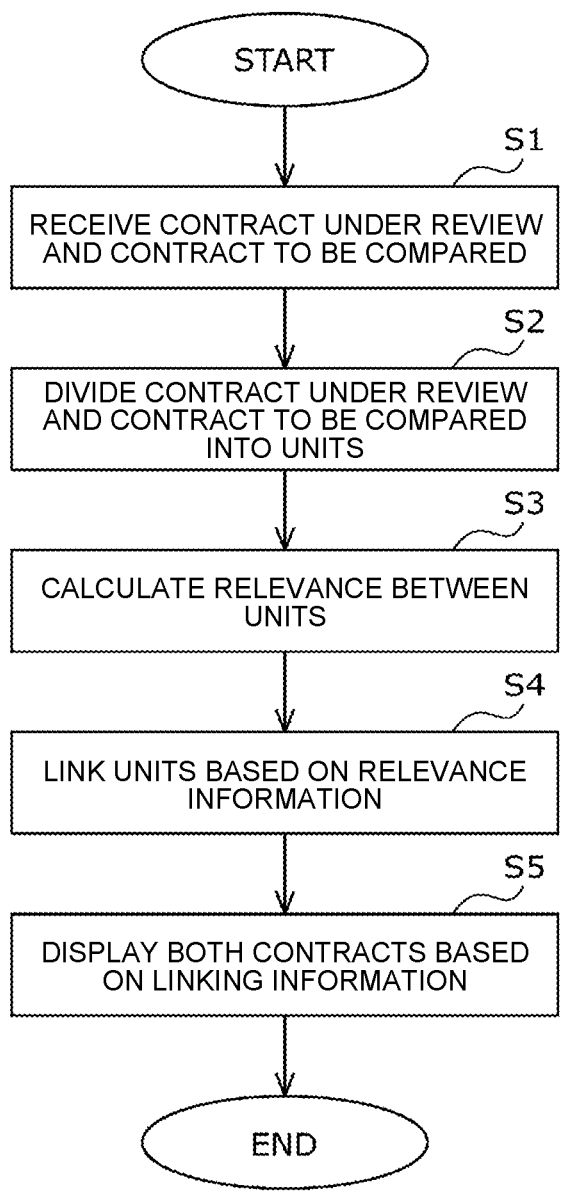
FIG. 9 is a flowchart illustrating a review operation of the document processing server device.

FIG. 9 is a flowchart illustrating a reviewing operation of the document processing server device 1 according to the present embodiment. Moreover, by way of example, FIG. 4A and FIG. 4B are schematic diagrams for processing the document information 111 in a document processing operation.

Figure 4A:
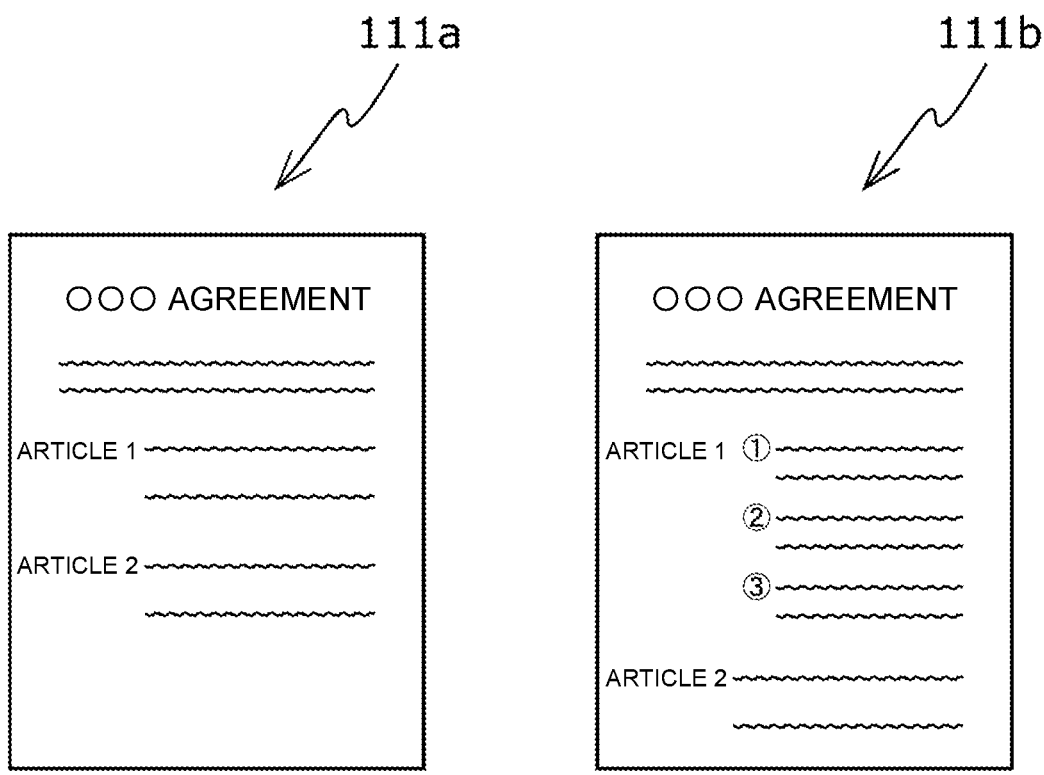
FIG. 4A is a schematic diagram for explaining an example of processing document information in a document processing operation.
Figure 4B:
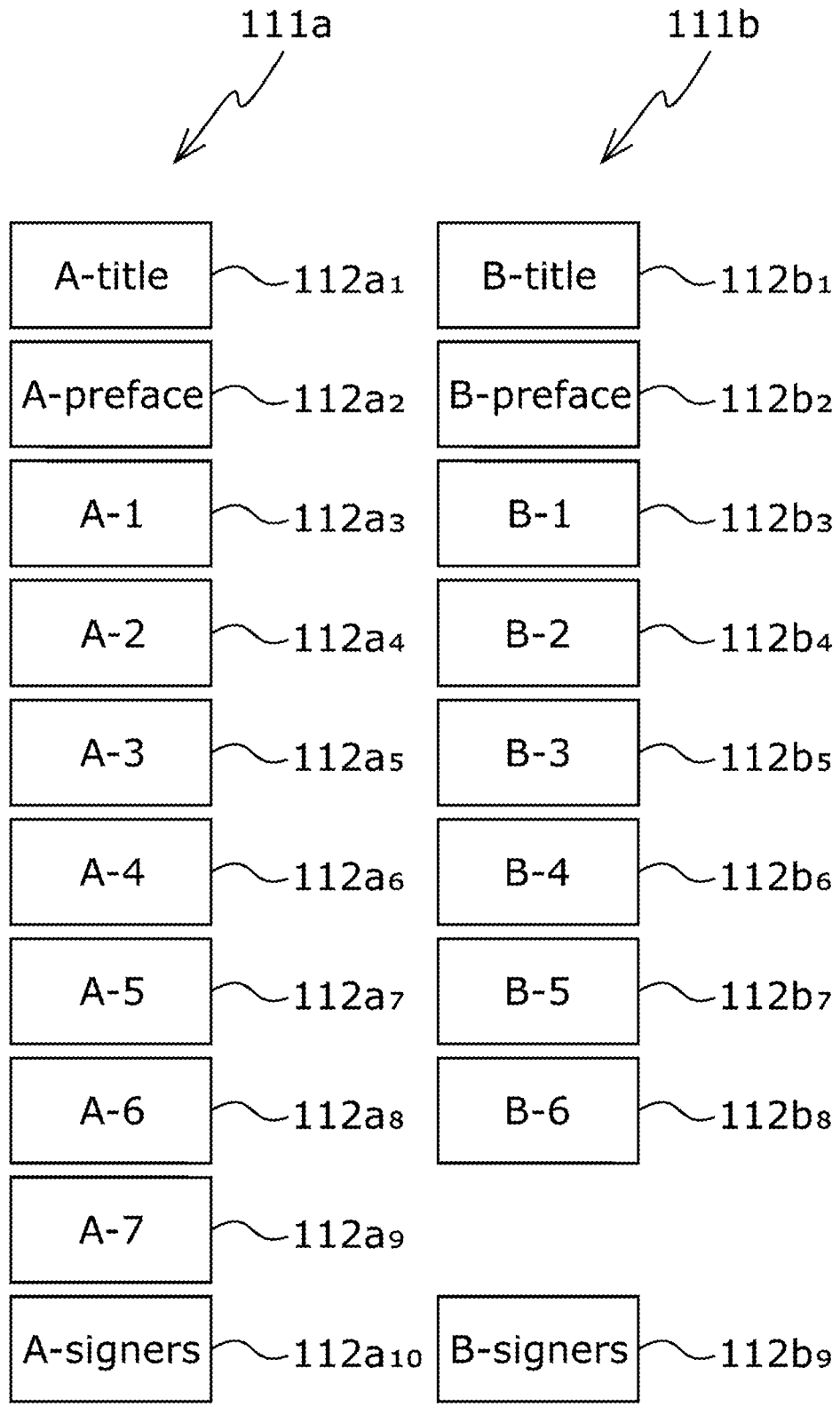
FIG. 4B is a schematic diagram for explaining an example of processing document information in a document processing operation.

First, the contract document divider element 101 of the document processing server device 1 may divide each of the selected document information 111a (first document information) and the document information 111b (second document information) to be compared illustrated in FIG. 4A into elements of a contract document and define the elements as the unit information 112, as illustrated in FIG. 4B (S2). The contract document divider element 101 may divide the document information 111a into the title $112a_1$, the preface $112a_2$, the article units $112a_3$ to $112a_9$, and a signing part $112a_{10}$. Further, the contract document divider element 101 may divide the document information 111b into a title 112b$_1$, a preface 112b$_2$, article units 112b$_3$ to 112ba$_8$, and a signing part 112ba$_9$. The contract document divider element 101 may also divide the document information 111a and 111b of interest on a section or item basis. The contract document divider element 101 may divide the document information 111 in units suitable for the structure thereof to generate the unit information 112.

Next, the relevance computing element 102 may calculate the degree of relevance between the article units 112a$_3$ to 112a$_9$ and the article units 112b$_3$ to 112ba$_8$ in the document information 111a and 111b and defines the resultant as the relevance information 113, as illustrated in FIG. 5A (S3). The degree of relevance is, for example, calculated by a method using editing distances between each of the article units in the document information 111a and 111b or a method of calculating cosine similarity by vectorizing the article units.

FIG. 5A and FIG. 5B are schematic diagrams illustrating an exemplary configuration of the relevance information 113 and the linking information 114, respectively.

FIG. 5A shows relevance information 113ab according to the present embodiment representing the degrees of relevance between the article units 112a$_3$ to 112a$_9$ of the document information 111a and the article units 112b$_3$ to 112ba$_8$ of the document information 111b. The article units 112a$_3$ to 112a$_9$ in the items of columns and the article units 112b$_3$ to 112ba$_8$ in the items of rows with their respective degrees of relevance are shown.

Next, on the basis of the relevance information 113ab calculated by the relevance computing element 102, the unit link element 103 may link the article units 112a$_3$ to 112a$_9$ of the document information 111a with the article units 112b$_3$ to 112ba$_8$ of the document information 111b so that the article units 112a$_3$ to 112a$_9$ correspond one to one to the article units 112b$_3$ to 112ba$_8$, and that the sum of the degrees of relevance is maximized, to generate linking information 114ab, as illustrated in FIG. 5B (S4). When the relevance between the article units in the two sets of document information is improved by combining the article units in one of the sets of the document information, the article units may be associated one to one after the article units in the one set of document information are combined together. When the relevance between the article units in the two sets of document information is improved by further dividing the article units in one of the sets of the document information, the article units may be associated one to one after division of the article units in the one set of document information. In such a manner, it is possible to link one or more units included in the document information 111a with one or more units included in the document information 111b one to one so as to maximize the sum of the degrees of relevance. Moreover, in addition to the maximum sum of the degrees of relevance, in a display operation as described below, all combinations of the degrees of relevance being a certain threshold or more or combinations of the degrees of relevance being multiple largest sums may be displayed, to allow the user to select a suitable combination from the combinations.

FIG. 5B shows linking information 114ab according to the present embodiment including the article units 112a$_3$ to 112a$_9$ and the article units 112b$_3$ to 112ba$_8$ linked with each other and including the article units 112a$_3$ to 112a$_9$ in the items of columns and the article units 112b$_3$ to 112ba$_8$ in the items of rows. The number "1" illustrated therein indicates that the article units are linked with each other.

Figure 6:
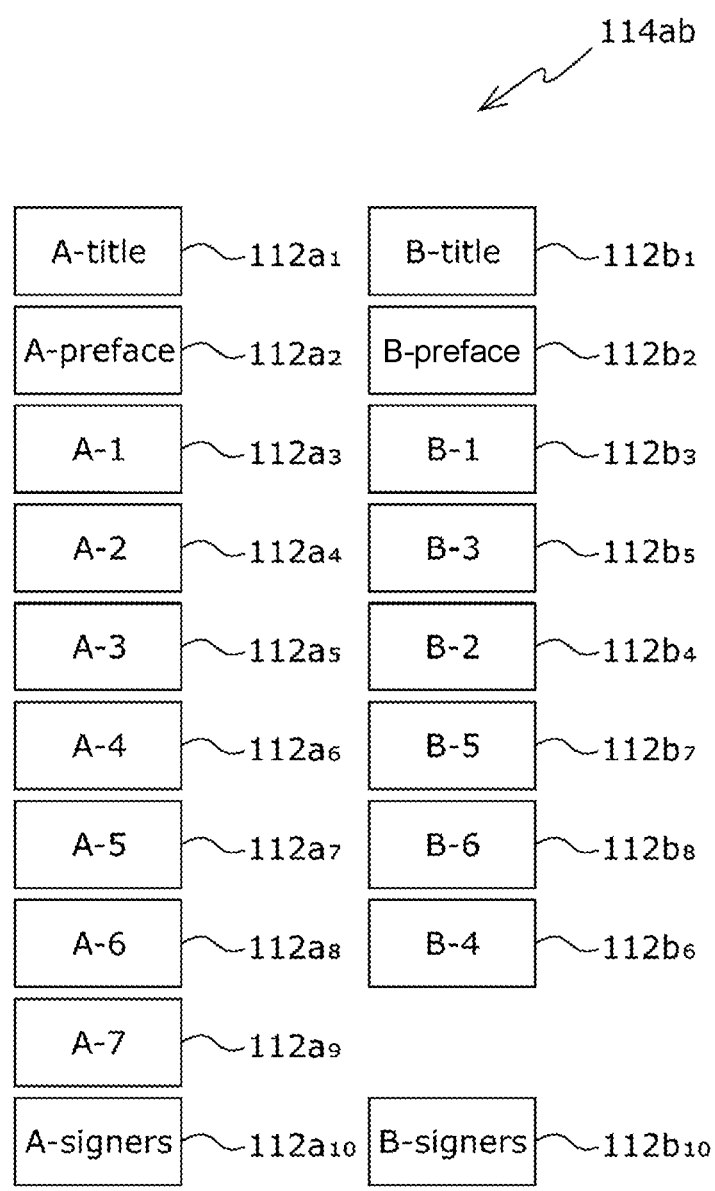
FIG. 6 is a schematic diagram illustrating a conceptual configuration of linking information.

FIG. 6 is a schematic diagram illustrating a conceptual configuration of the linking information 114 according to the present embodiment.

FIG. 6 illustrates one example of a conceptual correspondence between the document information 111a and 111b including the title 112a$_1$, the preface 112a$_2$, and the signing part 112a$_{10}$, and the title 112b$_1$, the preface 112b$_2$, and the signing part 112ba$_9$ in addition to the correspondence between the article units 112a$_3$ to 112a$_9$ and the article units 112b$_3$ to 112ba$_8$ included in the linking information 114ab in FIG. 5B. The article units 112a$_3$ to 112a$_8$ and the article units 112b$_3$ to 112ba$_8$ linked with each other may be represented side by side while the location next to the article unit 112a$_9$ with no link found is represented in blank.

Figure 8:
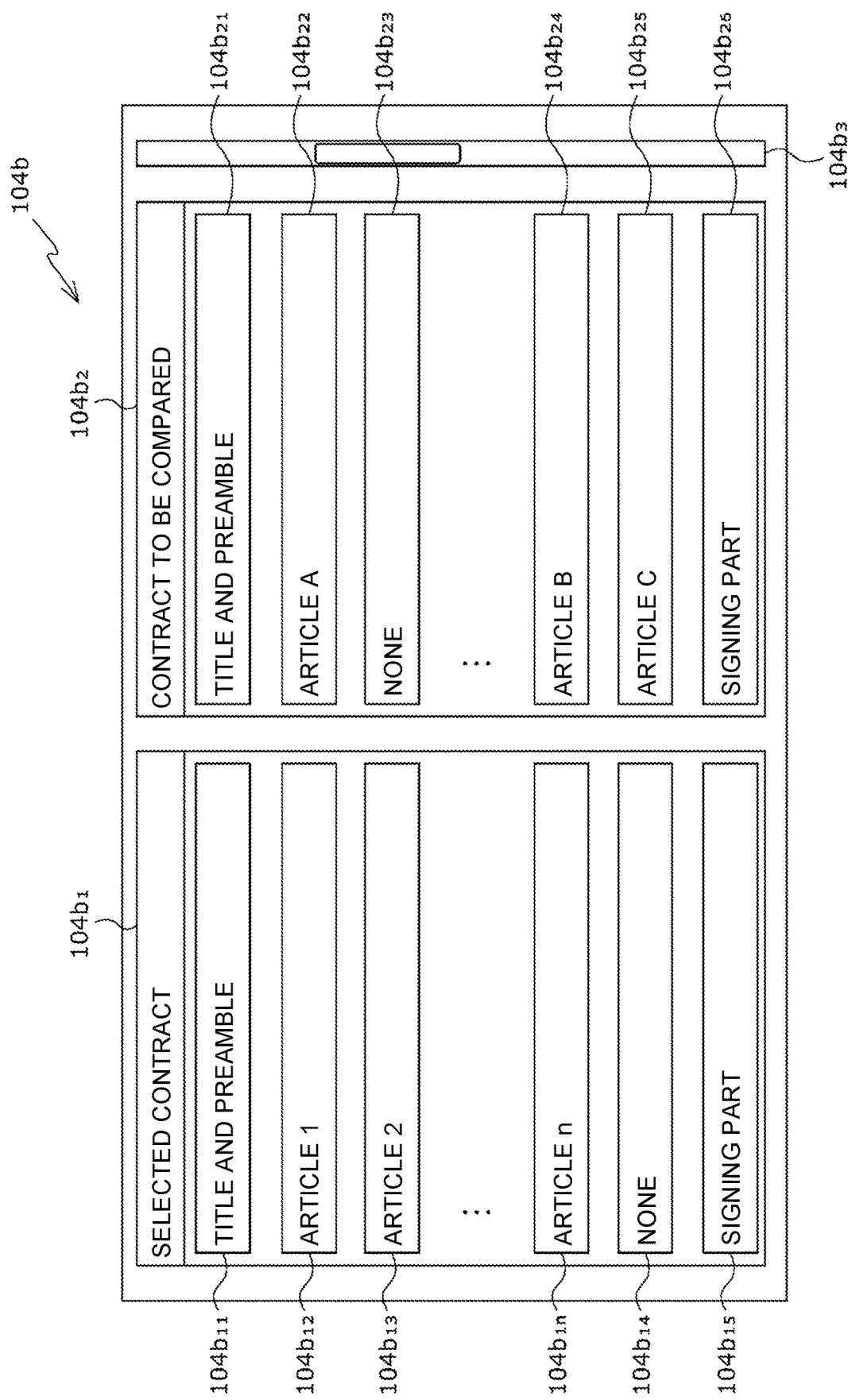
FIG. 8 is a schematic diagram illustrating an exemplary configuration of a screen displayed by the display control element on a display of a terminal.

The display control element 104, as illustrated in FIG. 8, may next control and display the article units 112a$_3$ to 112a$_9$ and the article units 112b$_3$ to 112ba$_8$ of the document information 111a and 111b on the display of the terminal 2 on the basis of the linking information 114 (S5).

FIG. 8 is a schematic diagram illustrating an exemplary configuration of a screen displayed on the display of the terminal 2 or 3 by the display control element 104.

A screen 104b may include a display field 104b$_1$ for showing the contents of a contract document under review, a display field 104b$_2$ for showing the contents of a contract document to be compared, and a slide bar 104b$_3$. The display field 104b$_1$ displays title and preface 104b$_{11}$, article units 104b$_{12}$ to 104b$_{14}$, and a signing part 104b$_{15}$. The display field 104b$_2$ may display title and preface 104b$_{21}$, article units 104b$_{22}$ to 104b$_{25}$, and a signing part 104b$_{26}$.

The article units such as the article units 104b$_{12}$, 104b$_{22}$ may be associated with each other and displayed side by side. No corresponding article unit may be found with respect to the article unit 104b$_{13}$ so that the article unit 104b$_{23}$ is indicated by "None" next to the article unit 104b$_{12}$ on display. Also, no corresponding article unit may be found with respect to the article unit 104b$_{25}$ so that the article unit 104b$_{14}$ is indicated by "None" next to the article unit 104b$_{25}$ on display.

According to the first embodiment described above, the document information 111a being first document information and the document information 111b being second document information may be each divided into article units to calculate the degree of relevance between the article units in the document information 111a and the article units in the document information 111b. The article units may be linked together one to one so as to maximize the degree of relevance. This may make it possible to display the relationship between the documents in units of articles. That is, it is possible to present the correspondence between articles included in two sets of document information even if the two sets of document information are document information before revision and edited document information after revision, or two sets of individually prepared document information of the same kind (for example, contracts such as non-disclosure agreement) written in different styles and in different orders. It is thereby possible to display the relationship between documents in terms of a predefined unit included in the documents.

Second Embodiment

A second embodiment will describe an example of creating a new and old comparison table of articles. The second embodiment is different from the first embodiment in reviewing the correspondence between two sets of document information without changing the order of the article units in each of the two sets of document information, and in presenting differences between the two sets of document information. The same elements as those in the first embodiment are denoted by the same reference numerals and a description thereof may be omitted.

Operation of Document Processing System

Next, an operation of the second embodiment will be described. The operation is divided into (1) basic operation and (2) document comparison operation for separate explanation. (1) basic operation is similar or the same as in the first embodiment, therefore, a description thereof will be omitted.

Figure 10:
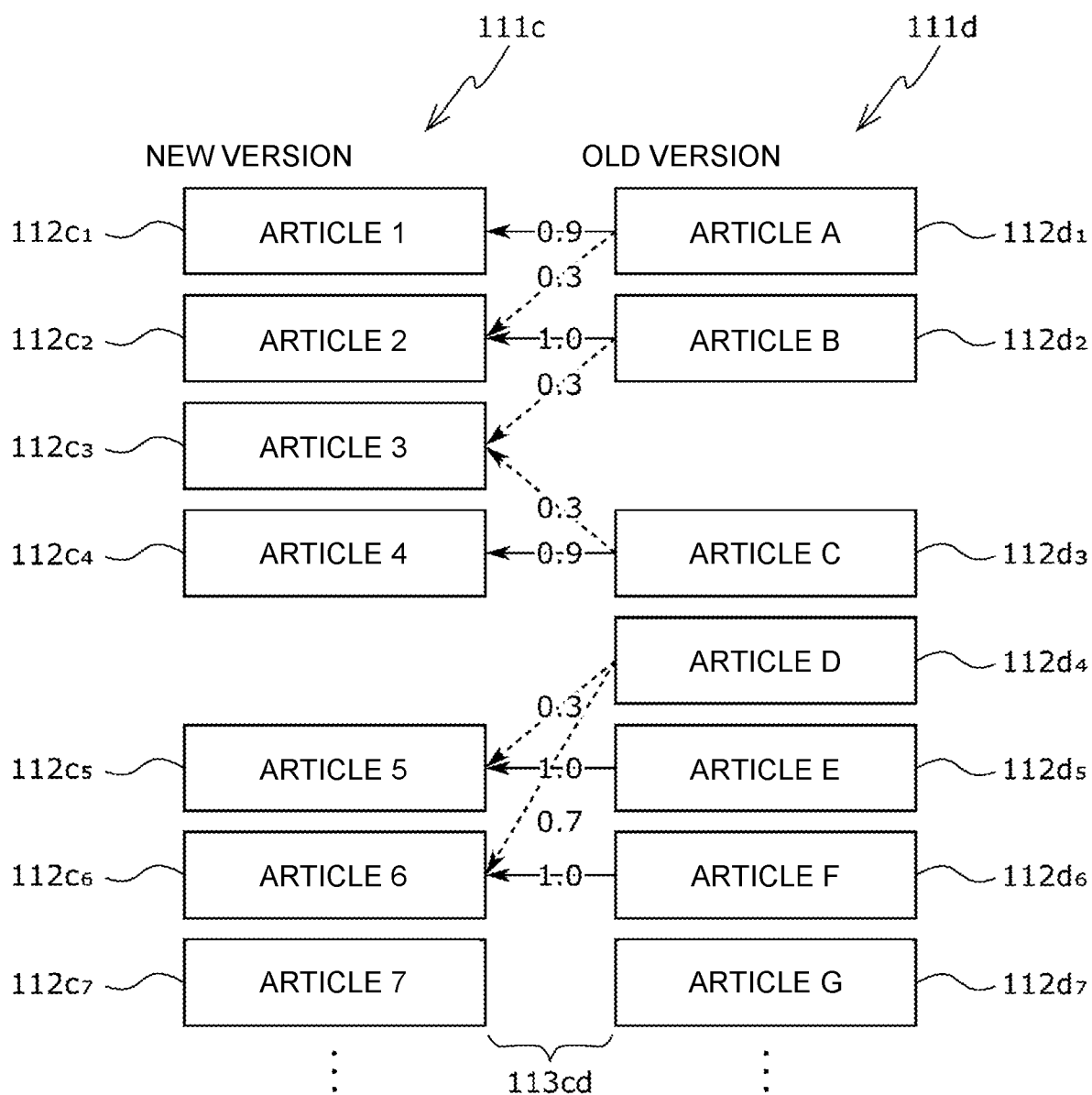
FIG. 10 is a schematic diagram for explaining an example of processing document information in a document processing operation and an exemplary configuration of relevance information.

FIG. 10 is a schematic diagram for explaining an example of processing document information 111 in a document processing operation according to the present embodiment and an exemplary configuration of relevance information 113.

First, the contract document divider element 101 of the document processing server device 1 may divide each of new document information 111$c$ (first document information) and old document information 111$d$ (second document information) into elements of a contract document, as illustrated in FIG. 10. In this example, for the sake of simple explanation, an operation with respect to only the article units excluding title, preface, and signing part will be described. The contract document divider element 101 may divide the document information 111$c$ into article units 112$c_1$ to 112$c_7$ . . . and the document information 111$d$ into article units 112$d_1$ to 112$d_7$ . . . .

Next, the relevance computing element 102 may calculate a degree of relevance between the article units 112$c_1$ to 112$c_7$ . . . and the article units 112$d_1$ to 112$d_7$ . . . in the two sets of document information 111$c$ and 111$d$ without changing the order of the article units 112$c_1$ to 112$c_7$ . . . and the article units 112$d_1$ to 112$d_7$ . . . and may define the resultant as relevance information 113$cd$.

Figure 11:
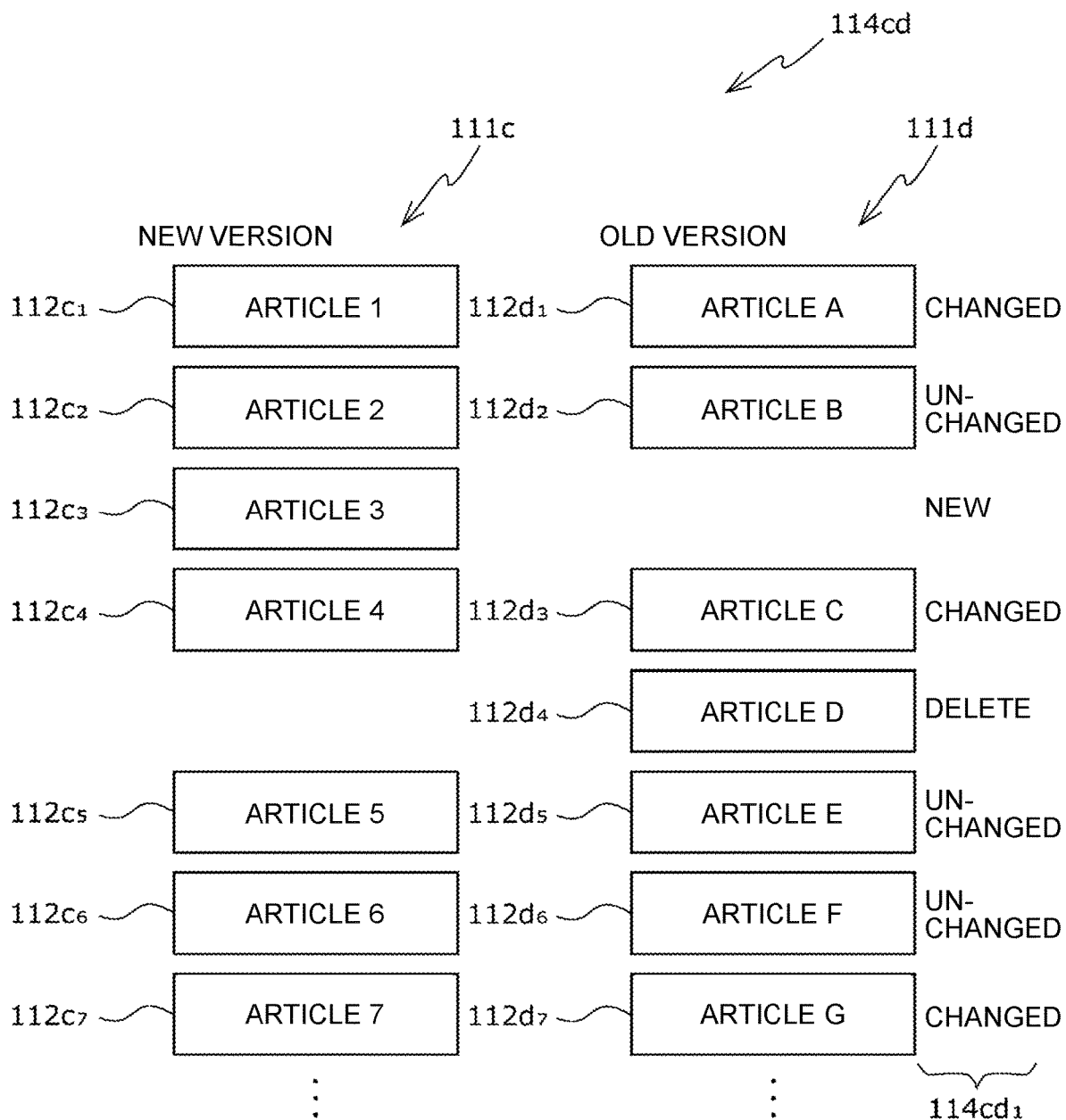
FIG. 11 is a schematic diagram illustrating a conceptual configuration of linking information.

FIG. 11 is a schematic diagram illustrating a conceptual configuration of linking information 114 according to the present embodiment.

Next, on the basis of the relevance information 113$cd$ calculated by the relevance computing element 102, the unit link element 103 may link the article units 112$c_1$ to 112$c_7$ . . . and the article units 112$d_1$ to 112$d_7$ . . . one to one in the document information 111$c$ and 111$d$ so as to maximize the degree of relevance without changing the order, to thereby generate linking information 114$cd$, as illustrated in FIG. 5B.

The unit link element 103 may calculate a difference between the associated article units, and write, to an item of difference 114$cd_1$, "Unchanged" if there is no difference, and "Changed" if there is any difference. The unit link element 103 may write "New" to the item of difference 114$cd_1$ if only the new version contains the article unit concerned, and may write "Delete" to the item of difference 114$cd_1$ if only the old version contains the article unit concerned.

Next, the display control element 104 may control and display the document information 111$c$ and 111$d$ on the display of the terminal 2 on the basis of the linking information 114$cd$.

Figure 12A:
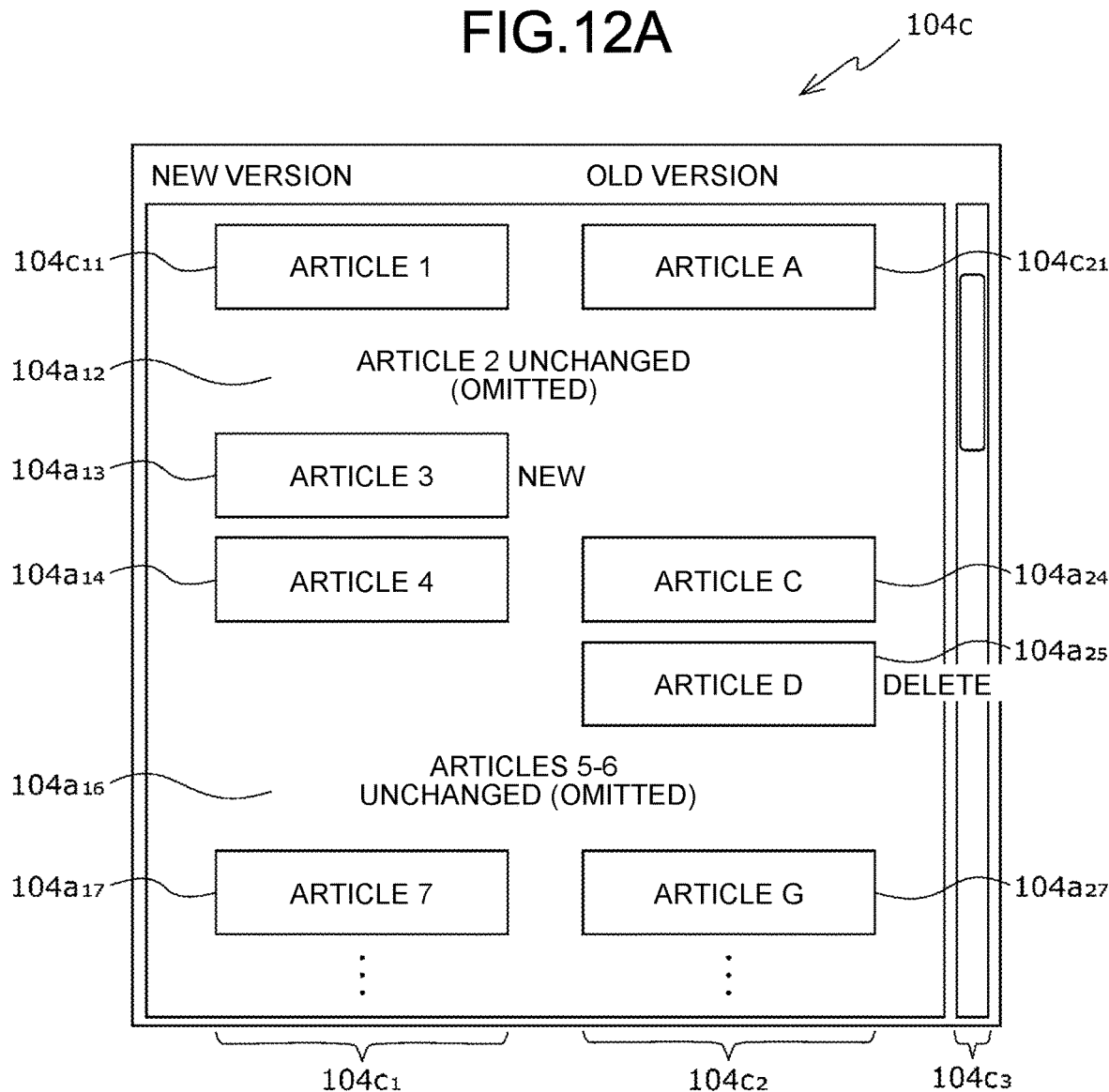
FIG. 12A is a schematic diagram illustrating an exemplary configuration of a screen displayed by the display control element on the display of the terminal.
Figure 12B:
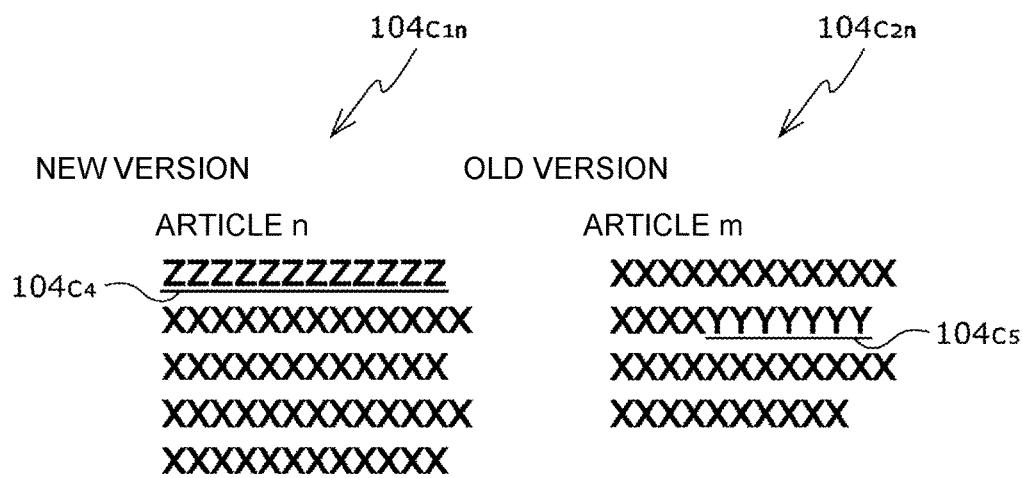
FIG. 12B is a schematic diagram illustrating an exemplary configuration of a screen displayed by the display control element on the display of the terminal.

FIGS. 12A and 12B are schematic diagrams illustrating an exemplary configuration of a screen displayed on the display of the terminal 2 or 3 by the display control element 104 according to the present embodiment.

As illustrated in FIG. 12A, a screen 104$c$ may include a display field 104$c_1$ for showing the contents of a new contract document, a display field 104$c_2$ for showing the contents of an old contract document, and a slide bar 104$c_3$. The display field 104$c_1$ may include article units 104$c_{11}$ to 104$c_{17}$, and the display field 104$c_2$ may include article units 104$c_{21}$ to 104$c_{27}$.

The article units associated with each other and having a difference, such as the article unit 104$c_{11}$ and the article unit 104$c_{21}$, the article unit 104$c_{14}$ and the article unit 104$c_{24}$, and the article unit 104$c_{17}$ and the article unit 104$c_{27}$, may be displayed side by side. The article units associated with each other and having no difference such as the article unit 104$c_{12}$ and the article unit 104$c_{16}$ and may be indicated by "Article XX Unchanged" on display. Like the article unit 104$c_{13}$, the article unit having no corresponding article unit in the old version may be indicated by "New" on display. Like the article unit 104$c_{25}$, the article unit having no corresponding article unit in the new version may be indicated by "Delete" on display. The display method described above is merely exemplary. New and old comparison may be displayed in other styles as long as change or no change in articles, new provision, deletion, or transfer of articles can be presented.

As illustrated in FIG. 12B, an article unit 104$c_{1n}$ and an article unit 104$c_{2n}$ are associated with each other and have a difference therebetween. In this case a changed portion (an edited portion where modification, addition, deletion, or else has been made) in the article unit 104$c_{1n}$ may be added with an underline 104$c_4$, and a changed portion in the article unit 104$c_{2n}$ may be added with an underline 104$c_5$, as an example of highlighting. The display method described above is merely exemplary. The difference in the old and new versions may be displayed in other styles as long as modification, addition, deletion, or transfer can be presented.

According to the above-described second embodiment, the degree of relevance between the article units included in the document information 111$c$ and 111$d$ may be calculated to link the article units without changing the order of the article units. The representations of the linked article units with a difference and the linked article units with no difference may be individually defined. The representation of the article units which are not linked with any article unit may be also defined. This may make it possible to display the relationship between documents in terms of a predefined unit included in the documents, and to automatically create a new and old comparison table to be prepared when the letter of law or a contract is revised. Moreover, it is possible to display a difference, if any, in units between the document information 111$c$ and the document information 111$d$ linked with the document information 111$c$ in a highlighted manner.

Other Embodiments

The present disclosure is not limited to the embodiments described above. Various modifications or changes may be made.

For example, the document information 111 can be documents describing laws or user manuals in addition to contracts or agreements as long as the document information 111 can be divided into elements. In addition, the elements may be words or letters and symbols or may be paragraphs or provisions, in addition to articles, sections, and items.

According to the above embodiments, the functions of the elements 100 to 104 of the control unit 10 are implemented by a computer program. Alternatively, the elements may also be entirely or partially implemented by hardware such as an application-specific integrated circuit (ASIC). Moreover, the computer program used in the above embodiments may be stored and provided in a recording medium such as a compact disc read-only memory (CD-ROM). The steps described in the above embodiments may be replaced, deleted, or added.

While certain embodiments have been described, these embodiments have been presented by way of example only, and are not intended to limit the scope of the inventions. Indeed, the novel methods and systems described herein may be embodied in different other forms; furthermore, various omissions, substitutions and varies in the form of the methods and systems described herein may be made without departing from the spirit of the inventions. The accompanying claims and their equivalents are intended to cover such forms or modifications as would fall within the scope and spirit of the inventions.

INDUSTRIAL APPLICABILITY

A document processing program, an information processing device, and a document processing method for displaying the relationship between documents in terms of a predefined unit included in the documents can be provided.

What is claimed is:

1. A non-transitory computer readable storage medium storing a document processing program for causing a computer to function as:
   a divider element configured to divide first document information and second document information in at least one predefined unit;
   a computing element configured to calculate a degree of relevance between the one or more units included in the first document information and the one or more units included in the second document information;
   a link element configured to link the one or more units included in the first document information and obtained by dividing the first document information with the one or more units included in the second document information and obtained by dividing the second document information on a one-to-one basis according to a calculated the degree of relevance between the one or more units included in the first document information and the one or more units included in the second document information; and
   a display control element configured to display, in combination, the one or more units included in the first document information and the one or more units included in the second document information individually linked with the one or more units included in the first document information, such that each pair of units included in the first and second document information and linked with each other is displayed side by side, and where each unit that is included in the first document information and the second document information includes no corresponding unit, the unit in the first document information and a no unit indicator in the second document information are displayed side by side, and where each unit that is included in the second document information and the first document information includes no corresponding unit, the unit in the second document information and a no unit indicator in the first document information are displayed side by side.

2. The storage medium according to claim 1, wherein each of the first document information and the second information is an agreement.

3. The storage medium according to claim 2, wherein the predefined unit is any of articles, sections, and items.

4. The storage medium according to claim 1, wherein each of the first document information and the second information includes a preface and an article.

5. The storage medium according to claim 1, wherein the first document information or the second document information is transmitted by one user to a server together with a request for another user to review the first document information or the second information, and
   in response to the request, the first document information or the second information is processed by the another user via the server.

6. The storage medium according to claim 1, wherein when the one or more units included in the first document information or in the second document information includes a newly provided unit, the display control element displays the unit with an indication that the unit is newly provided.

7. The storage medium according to claim 1, wherein when any of the one or more units included in the first document information or in the second document information has been deleted, the display control element displays the unit with an indication that the unit has been deleted.

8. An information processing device, comprising:
   one or more hardware processors configured to:
   divide first document information and second document information in at least one predefined unit;
   calculate a degree of relevance between the one or more units included in the first document information and the one or more units included in the second document information;
   link the one or more units included in the first document information and obtained by dividing the first document information with the one or more units included in the second document information and obtained by dividing the second document information on a one-to-one basis according to a calculated the degree of relevance between the one or more units included in the first document information and the one or more units included in the second document information; and
   display, in combination, the one or more units included in the first document information and the one or more units included in the second document information individually linked with the one or more units included in the first document information, such that each pair of units included in the first and second document information and linked with each other is displayed side by side, and where each unit that is included in the first document information and the second document information includes no corresponding unit, the unit in the first document information and a no unit indicator in the second document information are displayed side by side, and where each unit that is included in the second document information and the first document information includes no corresponding unit, the unit in the second document information and a no unit indicator in the first document information are displayed side by side.

9. The information processing device according to claim 8, wherein
   each of the first document information and the second information is an agreement.

10. The information processing device according to claim 9, wherein
    the predefined unit is any of articles, sections, and items.

11. The information processing device according to claim 8, wherein
each of the first document information and the second information includes a preface and an article.

12. The information processing device according to claim 8, wherein
the first document information or the second document information is transmitted by one user to a server together with a request for another user to review the first document information or the second information, and
in response to the request, the first document information or the second information is processed by the another user via the server.

13. The information processing device according to claim 8, wherein
when the one or more units included in the first document information or in the second document information includes a newly provided unit, the one or more hardware processors display the unit with an indication that the unit is newly provided.

14. The information processing device according to claim 8, wherein
when any of the one or more units included in the first document information or in the second document information has been deleted, the one or more hardware processors display the unit with an indication that the unit has been deleted.

15. A document processing method, comprising:
linking one or more units included in first document information with one or more units included in second document information on a one-to-one basis according to a degree of relevance between the one or more units included in the first document information and the one or more units included in the second document information; and
displaying, in combination, the one or more units included in the first document information and the one or more units included in the second document information individually linked with the one or more units included in the first document information, such that each pair of units included in the first and second document information and linked with each other is displayed side by side, and where each unit that is included in the first document information and the second document information includes no corresponding unit, the unit in the first document information and a no unit indicator in the second document information are displayed side by side, and where each unit that is included in the second document information and the first document information includes no corresponding unit, the unit in the second document information and a no unit indicator in the first document information are displayed side by side.

16. The document processing method according to claim 15, wherein
each of the first document information and the second information is an agreement.

17. The document processing method according to claim 16, wherein
the predefined unit is any of articles, sections, and items.

18. The document processing method according to claim 15, wherein
each of the first document information and the second information includes a preface and an article.

19. The document processing method according to claim 15, wherein
the first document information or the second document information is transmitted to a server by one user together with a request for another user to review the first document information or the second information, and
in response to the request, the first document information or the second information is processed by the another user.

20. The document processing method according to claim 15, wherein
the displaying comprises displaying, when the one or more units included in the first document information or in the second document information includes a newly provided unit, the unit with an indication that the unit is newly provided.

21. The document processing method according to claim 15, wherein
the displaying comprises displaying, when any of the one or more units included in the first document information or in the second document information has been deleted, the unit with an indication that the unit has been deleted.

* * * * *